(12) United States Patent
Cooley

(10) Patent No.: US 7,954,277 B2
(45) Date of Patent: Jun. 7, 2011

(54) PLANT CONTAINER

(76) Inventor: John Newsome Cooley, Newmarket (GB)

( * ) Notice: Subject to any disclaimer, the term of this patent is extended or adjusted under 35 U.S.C. 154(b) by 730 days.

(21) Appl. No.: 11/659,992

(22) PCT Filed: Jul. 20, 2005

(86) PCT No.: PCT/GB2005/002847
§ 371 (c)(1),
(2), (4) Date: Mar. 12, 2007

(87) PCT Pub. No.: WO2006/016100
PCT Pub. Date: Feb. 16, 2006

(65) Prior Publication Data
US 2007/0251144 A1    Nov. 1, 2007

(30) Foreign Application Priority Data
Aug. 12, 2004    (GB) .................................. 0418026.1

(51) Int. Cl.
*A01G 23/02*    (2006.01)
(52) U.S. Cl. ............................................ 47/73; 47/65.5
(58) Field of Classification Search ............. 47/73, 65.5, 47/75, 32.7, 87
See application file for complete search history.

(56) References Cited

U.S. PATENT DOCUMENTS

| | | | | |
|---|---|---|---|---|
| 4,442,628 A | | 4/1984 | Whitcomb | 47/66 |
| 4,497,132 A | * | 2/1985 | Whitcomb | 47/73 |
| 4,510,712 A | | 4/1985 | Whitcomb | 47/66 |
| 4,574,522 A | | 3/1986 | Reiger et al. | 47/78 |
| 4,716,680 A | | 1/1988 | Whitcomb et al. | 47/73 |
| 4,753,037 A | * | 6/1988 | Whitcomb | 47/73 |
| 4,793,097 A | | 12/1988 | Whitcomb | 47/86 |
| 4,939,865 A | | 7/1990 | Whitcomb et al. | 47/77 |
| 5,241,784 A | * | 9/1993 | Henry | 47/66.1 |
| 5,459,960 A | | 10/1995 | Manlove | 47/66 |
| 5,557,886 A | * | 9/1996 | Whitcomb | 47/73 |
| 6,266,921 B1 | * | 7/2001 | Keskilohko | 47/86 |
| 6,526,693 B2 | * | 3/2003 | Cochran | 47/66.5 |
| 7,210,266 B2 | * | 5/2007 | Henry et al. | 47/73 |
| 2003/0079401 A1 | | 5/2003 | Whitcomb | 47/32.7 |
| 2003/0167688 A1 | * | 9/2003 | Atchley et al. | 47/73 |
| 2003/0188480 A1 | | 10/2003 | Whitcomb | 47/72 |
| 2004/0200141 A1 | | 10/2004 | Whitcomb | 47/32.7 |
| 2004/0237389 A1 | | 12/2004 | Whitcomb | 47/32.7 |
| 2005/0223639 A1 | | 10/2005 | Whitcomb | 47/65.6 |

FOREIGN PATENT DOCUMENTS

| | | |
|---|---|---|
| CA | 1070114 | 1/1980 |
| EP | 0578153 | 2/1993 |
| WO | 93/03602 | 3/1993 |
| WO | WO 01/80625 A1 | 1/2001 |

OTHER PUBLICATIONS

International Search Report (WO 99/35898) Jul. 22, 1999, Lehmann.
RootMaker Products Company, LLC product list, printed Jul. 30, 2004.

* cited by examiner

*Primary Examiner* — Rob Swiatek
*Assistant Examiner* — Kristen C Hayes
(74) *Attorney, Agent, or Firm* — Joseph T. Guy; Nexsen Pruet, LLC

(57) ABSTRACT

A container for growing plants has a base and a side wall extending upwardly from the base, for containing a growing medium. An opening is defined in an inclined portion of the side wall, and a rib positioned on the side wall and facing into the container defines a root-guiding angle between the rib and the side wall, the root-guiding angle leading to the opening. Plant roots growing adjacent to the side wall are therefore guided by the root-guiding angle to the opening to be air pruned.

33 Claims, 13 Drawing Sheets

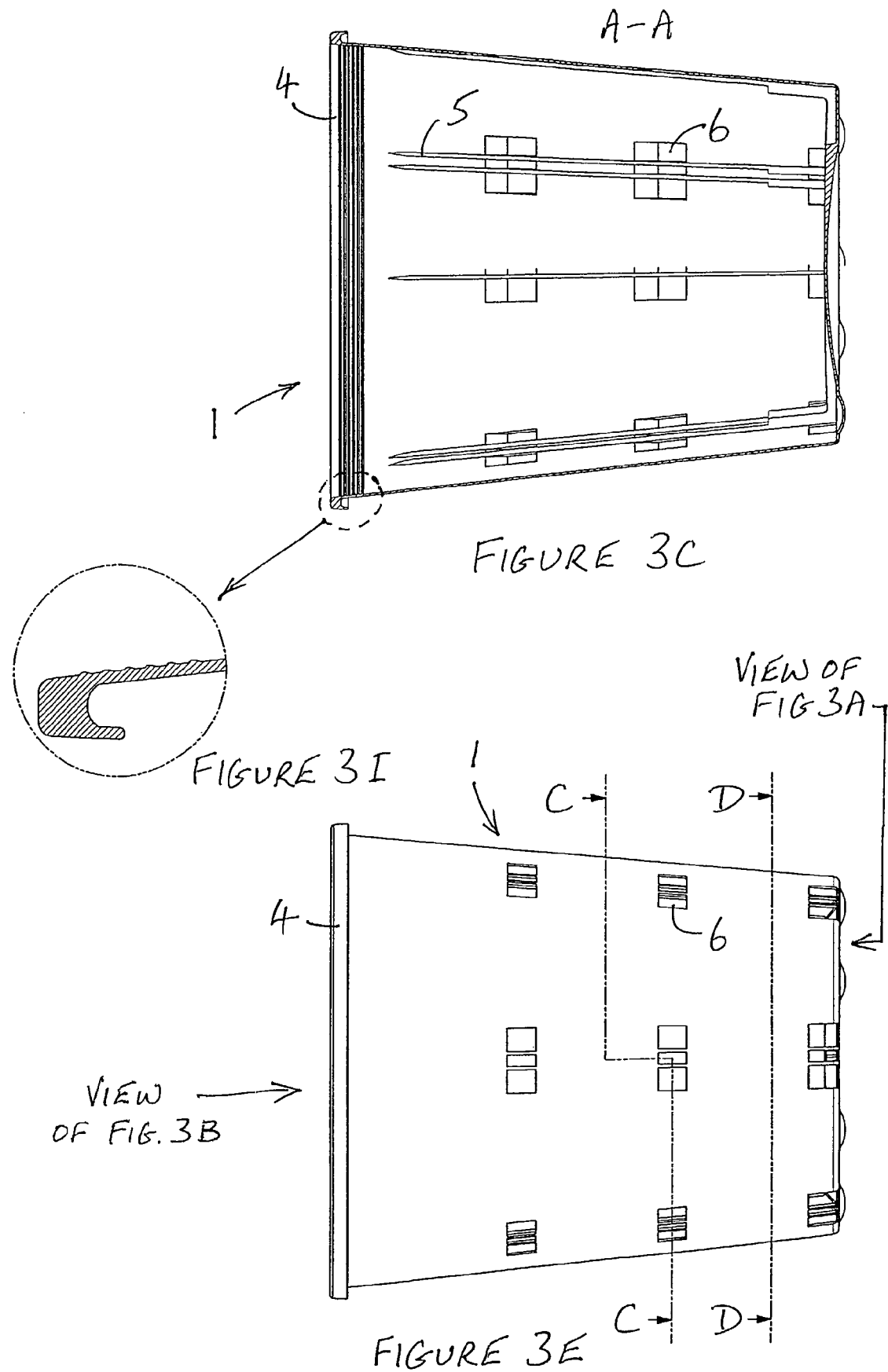

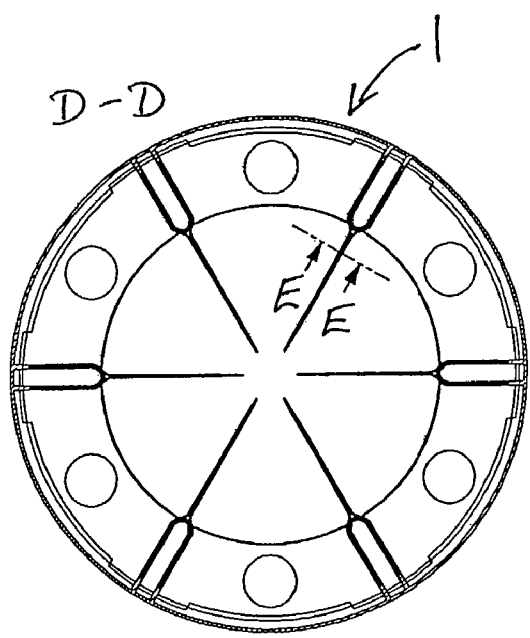
FIGURE 3G
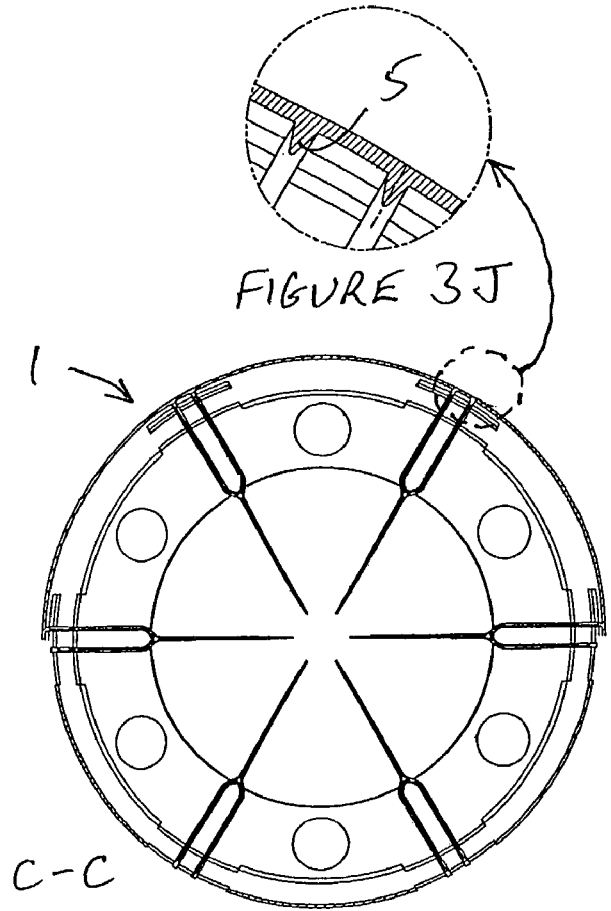
FIGURE 3J
FIGURE 3F
FIGURE 3H

FIGURE 6D
B-B
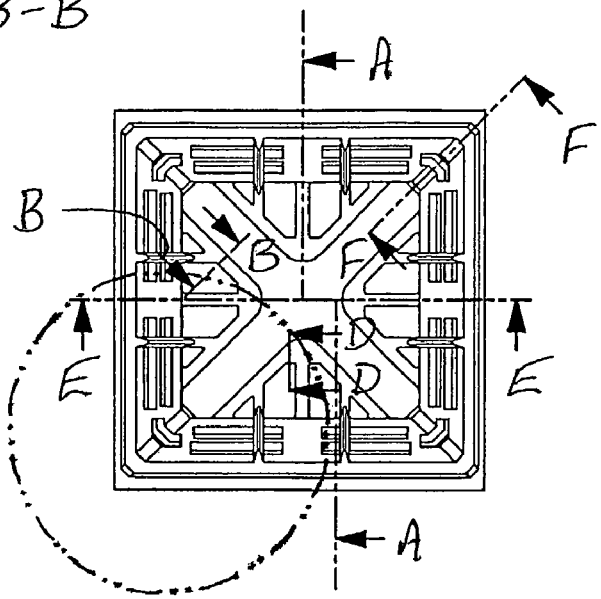
FIGURE 6A
E-E
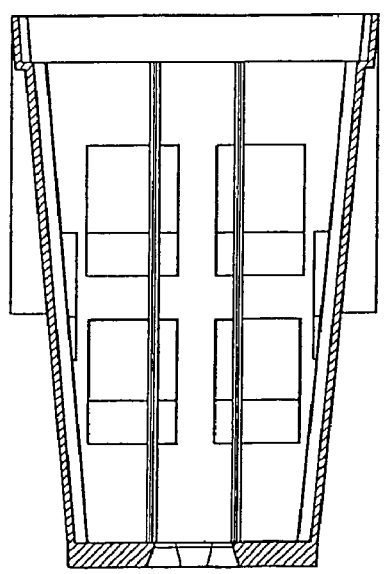
FIGURE 6F

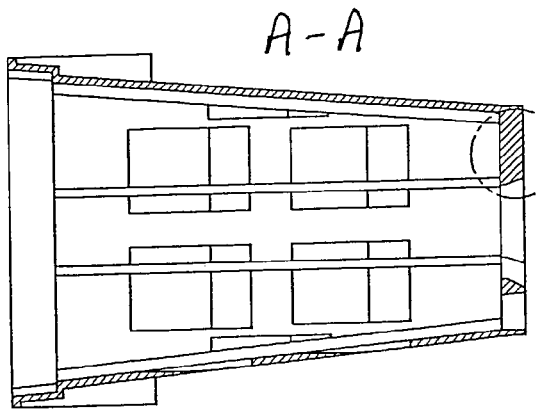
FIGURE 6C
FIGURE 6I
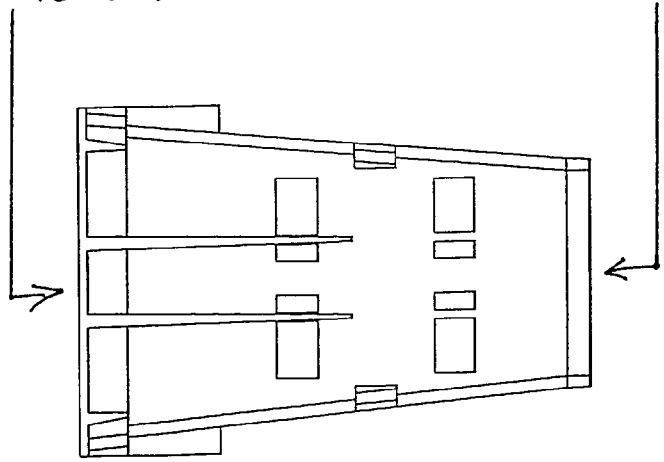
FIGURE 6J
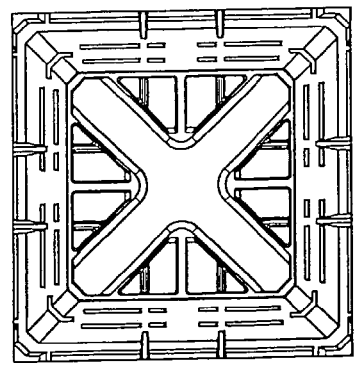
FIGURE 6B

DETAIL FROM FIG 6A

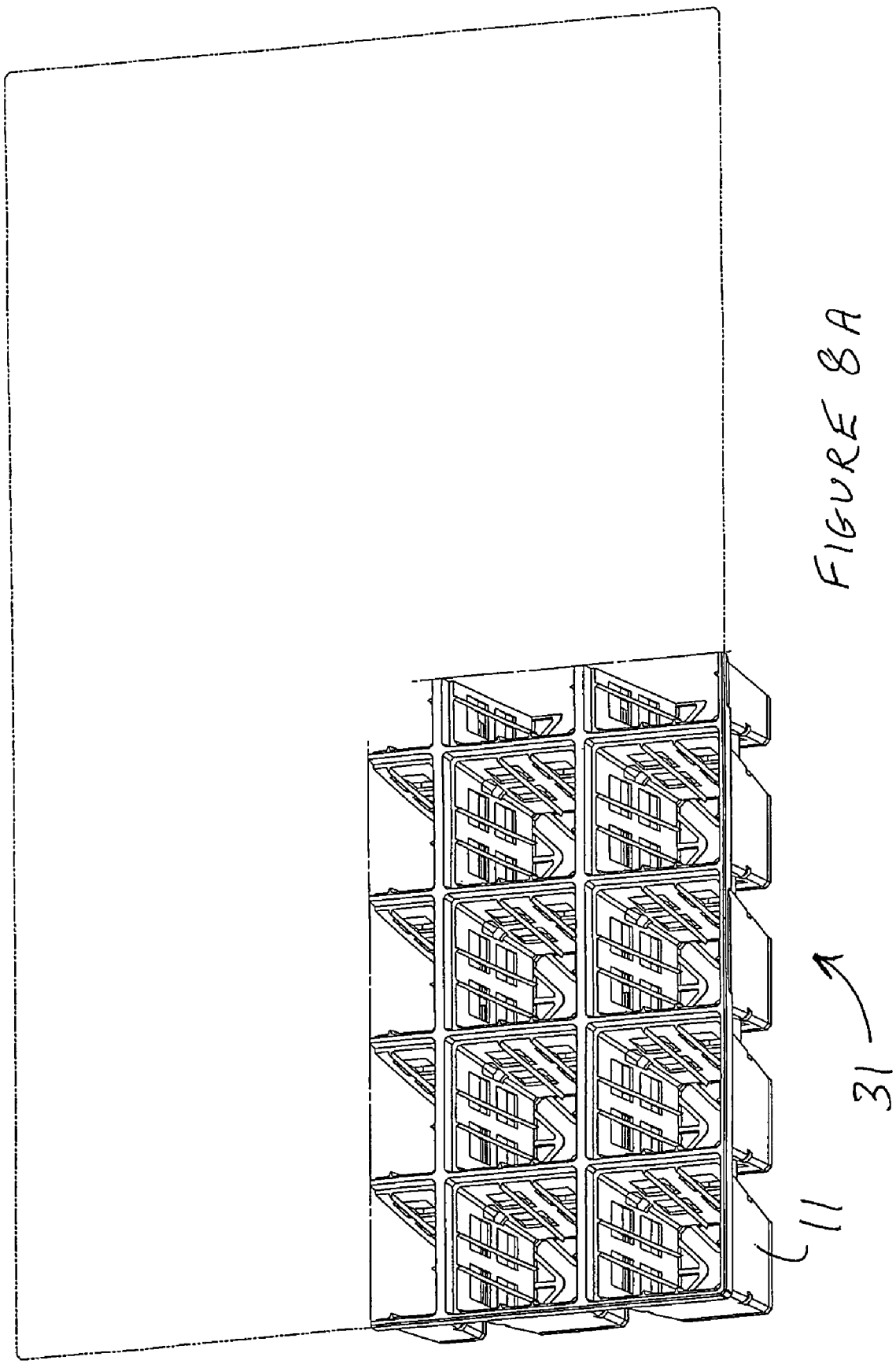

PLANT CONTAINER

The present invention relates to a container for growing plants, including a single growing container and a plant-growing tray comprising two or more containers. The container optionally accommodates an insert.

Horticulture involves the cultivation of plants such as fruits, vegetables, flowers or ornamental plants. Forestry involves the cultivation and husbandry of larger plants such as conifers and pines. In both disciplines, plants are propagated either from cuttings (vegetative propagation) or seed (sexual propagation). Propagation may be defined as growing a plant from seed or a cutting to a certain stage or size where it needs to be moved to a larger container and/or a different environment.

Originally propagation took place in the soil of outside fields. The development of greenhouses allowed for enhanced protection of soil-grown plants. In the last century, nurseries have used containers or trays to propagate plants. These containers or trays contained many plants sharing the same soil mass. The containers or trays enabled plants to be moved easily and allowed soil to be sterilised for disease control. More recently, trays containing individual cells or compartments have been available. Compartmentalised trays keep the root systems of adjacent plants separate from each other. For example, EP0323674 discloses trays with cavities for plants provided in compressed peat modules, in which the containers have full-length longitudinal slits alongside each compressed peat module which act as guide channels for tools for extracting the compressed peat modules from the tray. A similar tray is disclosed in EP0500163.

A plant growing in a confined container typically develops a tap root which grows downwards until becoming physically trapped by the container base, causing termination of growth, or becoming air-pruned when exiting holes in the base of the container. Lateral roots then grow outwardly from the plant towards the sides of the container and generally downwardly due to geotropism. Lateral roots contacting the sides of the container move around and down the sides of the container, a phenomenon known as spiral root growth or "root circling". Root circling is disadvantageous because the root mass or ball thus formed can make removal of the plant from the container difficult. Root development and root function of plants subsequently removed from the container and transplanted may be inhibited, thus affecting the survival of the transplanted plant.

Root pruning of container-grown plants to prevent or treat root circling has been effected in a number of ways. Plants growing in containers can be lifted and excess roots mechanically trimmed. This would often be done immediately prior to transplantation, when root circling may have already damaged future development of the plant. Mechanical methods may also be time-consuming and labour-intensive. Chemical methods have also been used to prune roots. For example, a root tip-inhibiting copper-based compound has been coated onto the inner surface of a container so that root tips are stunted as they grow close to the copper layer. Use of such chemicals may be associated with health and environmental risks, and copper-treated containers often do not have drainage holes so aeration is not optimal.

A further development to avoid root circling in plant-growing containers has been to provide apertures or openings in plant-growing containers through which roots protrude but are stunted in growth (i.e. pruned) by air. Air-pruning offers a simple yet effective way to prevent root circling and does not have environmental concerns.

Several different types of plant-growing containers with air-pruning openings have been described in the prior art. U.S. Pat. No. 5,241,784 teaches a container with a side wall having corrugations to direct roots to air-pruning openings. U.S. Pat. No. 4,753,037 describes a plant-growing container with a side wall including horizontally positioned, upwardly facing internal ledges each with several openings extending through the ledge. Roots growing laterally within the container are said to be trapped by the ledges and guided through the openings to become air-pruned. In another variation, U.S. Pat. No. 5,557,886 teaches a plant-growing container with outer side wall portions and inset side wall portions. The inset side wall portions are displaced inwardly from the outer side wall portions, thereby defining root air-pruning openings. Roots growing along the internal ledges are reportedly directed to the openings to become air-pruned. In other prior art examples, it is known to include lateral openings or slits in side walls of plant-growing containers or compartments of plant-growing trays to facilitate air-pruning of roots. Some containers have internally positioned "ribs" which, when used in combination with air-pruning openings, are designed to guide roots in the direction of the openings.

Despite the developments in plant-growing containers in recent years, there remain disadvantages in their shape and/or design features. Containers may be expensive or impractical to manufacture or use. Also, containers may not achieve effective air-pruning of roots, or air-pruning may not be correctly balanced with other requirements for effective propagation such as handling of containers, aeration and removal of plants for transplantation. The present invention in its various aspects aims to provide an alternative plant-growing container, plant-growing tray, and plant-growing tray or container insert.

According to a first aspect of the present invention there is provided a container for growing plants, comprising a base, a side wall extending upwardly from the base, a rib positioned on the side wall and facing into the container, and an opening defined in an inclined portion of the side wall, in which a root-guiding angle is defined between the rib and the side wall, the root-guiding angle leading to the opening. The root-guiding angle may be between 60 and 120 degrees, preferably between 75 and 105 degrees, and particularly preferably about 90 degrees (i.e. substantially perpendicular).

An advantage of the container is that a root of a plant growing in the container can grow downwardly along the root-guiding angle into the opening to become air-pruned. The root-guiding angle formed between the rib and the side wall channels and directs the growing root into the opening in the side wall. A root is oriented along the root-guiding angle between the rib and the side wall until the root-guiding angle leads into an opening. It is therefore difficult for the end of the growing root to avoid the opening and becoming air-pruned, and air-pruning efficiency is increased.

The container has an opening located in an inclined portion of the side wall of the container, which is easier and less expensive to manufacture than a container with an opening in a horizontal ledge, for example as disclosed in U.S. Pat. No. 4,753,037. In one aspect of the invention, the side wall of the container does not have horizontal ledges. If horizontal ledges are contained in the side wall of the container of the present invention, these ledges preferably do not define an opening.

The root-guiding angle preferably terminates at (i.e. leads directly into) the side wall opening. A root growing downwardly along the root-guiding angle should in this way be prevented from escaping the opening by growing around the opening.

In a further aspect of the invention, the rib extends across or adjacent the opening. Thus, although the root-guiding angle leads into the opening, the rib may continue past the opening. In one embodiment, the opening may extend across both sides of the rib. Here, the rib is flanked by the opening. This allows root-guiding angles defined on both sides of the rib adjacent the side wall to lead into the opening.

The side wall may incline outwardly from the base. An inclined side wall allows easier insertion and removal of a plant and growing medium (for example soil and/or compost) into and from the container. The opening is preferably in the plane of the inclined side wall. The containers may be stackable, in which case having an inclined side wall will improve handling.

The side wall may be inclined at a substantially constant angle. The side wall may be inclined outwardly from the base at an angle between substantially vertical and 30 degrees, for example 7 degrees or 8 degrees. A constantly angled side wall is likely to be easier to manufacture. Alternatively, the side wall may be vertical.

The container may further comprise a rim at an upper end of the side wall. The rim may improve handling of the container or strengthen the container.

The rib of the container is preferably substantially parallel to the side wall (i.e. oriented on the side wall substantially perpendicularly to the base of the container, or substantially vertically while the container is in use). The root-guiding angle will likewise be substantially parallel to the side wall. Roots will then be prevented from growing laterally in either direction.

The container may comprise two or more openings in the side wall. The two or more openings may be vertically spaced in the side wall. The openings are advantageously spaced in vertical columns around the container.

The root-guiding angle defined by the rib and the side wall may lead to two or more openings spaced vertically in the side wall.

The container preferably comprises two or more ribs. The root-guiding angle defined by each of the two or more ribs may lead to the same opening. For example, a pair of substantially parallel ribs may lead to the same opening.

The two or more ribs may be positioned radially on the side wall (i.e. circumferentially spaced around the side wall). The container may for example comprise several pairs of substantially parallel radially-positioned (circumferentially-spaced) ribs, each pair of ribs leading into two or more openings spaced vertically in the side wall.

The container may comprise one or more base ribs extending upwardly from the base such that the base and the or each base rib define a root-guiding angle leading to an opening in the base or in a portion of the side wall adjacent the base. Roots reaching the base may thus likewise be guided into an opening to become air-pruned.

The container may be substantially circular in transverse section. Alternatively, the container may be substantially square in transverse section. The container may have more than one shape along its length, for example be square in transverse section at the base and become circular in transverse section outward from the base (i.e. at some height above the base).

The or each side wall opening of the container may have a tapered upper edge which forms a root-cutting edge on removal of the plant from the container. Roots which have been air-pruned at an opening may nevertheless protrude from the opening. Under humid conditions the end of a air-pruned root may expand in length and/or diameter and become larger outside the container than the width of the opening. Removal of a plant from the container will be improved by the root-cutting edge of the opening because protruding and obstructing roots will be cut as the plant is lifted.

In an alternative embodiment, the width of the opening may increase towards its upper end. This arrangement may prevent or limit damage to a plant root system when a plant is lifted from the container by allowing expanded root ends to be drawn through the opening. In addition, easing the passage of such expanded root ends through the opening may advantageously reduce the force required to lift the plant.

The opening in the side wall may be the form of a slot having an enlarged portion at its upper end. For example, the opening may have a "keyhole" design. Alternatively, the opening may be substantially tapered.

The container may be formed as an individual unit, for example as a pot such as a "1 gallon" (approximately 3.785 litre) pot.

Alternatively, the container may be part of a multi-container plant-growing tray. An example is a plant-growing tray having 45 containers (or "cells") arrayed in a 5-cell by 9-cell grid.

At least one rib of the container may be integral with the sidewall.

At least one rib may be part of a removable insert, which is described in more detail below.

In another embodiment, at least one rib is integral with the container and at least one rib is part of a removable insert.

The insert may be shaped so that, firstly, an outer surface of a growing medium filled into the insert contacts both an inner surface of the insert and an inner surface of the side wall, and secondly, when the insert is removed, substantially all of the growing medium is retained by the insert.

The insert effectively holds together the growing medium so that, even if a plant is not growing in the insert (for example if a plant cutting has died or a seed has failed to germinate), the insert and growing medium can be removed. The insert and its contents can thus be removed from the container, for example a cell or container which is part of a plant-growing tray, a process which is difficult to achieve using traditional methods employing a lifting fork or trowel. The use of inserts may thus allow a plant-growing tray with a plurality of containers or cells to be sorted to form a tray of uniform, undamaged and/or healthy plants.

The insert may contact less than 60% or 50% of the outer surface of the growing medium, preferably less than 40% or 30% of the surface area of the growing medium, and particularly preferably less than 25%, 20%, 15%, 10% or 5% of the surface area of the growing medium. An insert contacting less surface area of the growing medium will allow more of the growing medium to contact the inner surface of the side wall so that (a) the growth of plant roots in the growing medium may be determined by the side wall and other features of the container and (b) the growing medium (and a plant growing therein) may be easily removed from the insert. An insert contacting less surface area of the growing medium may also advantageously be lighter and require less manufacturing material. The insert must, however, be able to retain substantially all of the growing medium when the insert is removed from the container.

An upper end of the insert may define an opening through which the growing medium can be withdrawn.

The insert may be foraminous. The presence of spaces or holes in the insert allows the growing medium to contact the cell wall and/or other features of the container.

In a preferred embodiment, the insert is rigid. A rigid insert may facilitate handling of the insert. A rigid insert may be particularly useful for handling by lifting and/or transporting machines.

The insert may comprise growing-medium-supporting side structures and a base. The structures may be spaced around the insert. The base may also comprise spaced growing-medium-supporting structures. The insert may thus in appearance and function resemble a basket which is able to retain growing medium and be removed from the container.

The growing-medium-supporting side structures may extend upwardly from the insert base to an upper rim. Inclined side structures allow easier insertion and lifting of the insert.

The insert may have a sliding or snug fit with the side walls and/or ribs of the container. The sliding fit may be facilitated by corresponding structures of the container, which may for example comprise ribs complementary to the growing-medium-supporting side structures of the insert. A snug fit may advantageously prevent growing medium and/or roots from entering between the insert and the container side walls and/or ribs;

In one embodiment, the container may be designed so that physical constraints provided by the insert are duplicated by the container without an insert so that plants grown in containers with or without inserts are subjected to essentially similar physical constraints.

The growing-medium-supporting side structures may be inwardly displaced from the upper rim of the insert so that the upper rim extends outwardly beyond an inner surface of the side wall when the insert is inserted. This fit will facilitate removing the insert from the container.

One or more growing-medium-supporting side structures of the insert may be in the form of ribs. The growing-medium-supporting side structure of the insert and the side wall of the container may thus also define a root-guiding angle as hereinbefore described.

In one embodiment, a lifting structure of the insert base intercepts an aperture in the container base which allows access to lift the insert.

In a further aspect of the invention there is provided a method for growing a plant in a plant-growing tray with two or more containers (or cells), comprising the steps of fitting an insert as defined herein into the container and growing a plant within the container. The method has an advantage that the insert can be removed from the container, with minimal effect on a plant within the insert or on other plants in a multi-container plant-growing tray. A young plant with an undeveloped root system could, for example, be removed from the plant-growing tray without damaging the roots because the insert is able to hold the growing medium together. This would not be possible in a system where developed roots are essential for binding the growing medium. Another advantage is that a plant-growing tray or plant-growing trays with uniform or different plants can be created.

The method may further comprise the step of removing and optionally replacing an insert in which a plant has failed to grow sufficiently. In this embodiment, for example, a plant-growing tray with multiple containers may be sorted to comprise substantially uniform plants, i.e. plants of the same size and/or colour.

The method may yet further comprise the steps of lifting the insert from the container and extracting a plant from the lifted insert. Lifting the insert from the container allows the plant roots and growing medium to be separated from the container while keeping the roots and growing medium intact. Extracting the plant from the lifted insert may then be easier, particularly where the surface area of the insert is small compared with that of the container, as binding forces holding the plant in the plant-growing tray will have been substantially reduced by lifting the insert from the container.

The method may be automated. Machines can be used for example for positioning the insert in the container, for early lifting and sorting, for removal of inserts with dead or non-viable plants, and for lifting to remove a plant and/or for transplantation.

In another aspect of the invention, there is provided a plant-growing apparatus comprising a plant-growing tray and one or more inserts as defined herein.

Also provided is an insert-lifting machine for lifting inserts. The insert-lifting machine may comprise a lifter for passing through an aperture of the container to lift the lifting structure of the base of the insert. The lifter (or a portion of the lifter, or a second lifter) may subsequently lift a plant (and growing medium bound by the plant roots) from the insert, preferably after contact between an outer surface of the insert and an inner surface of the container has been disrupted by the lifter. In one embodiment, the lifter may comprise an outer and an inner portion, with the outer portion lifting the insert and the inner portion lifting the plant. The insert-lifting machine may alternatively comprise a lifter which lifts the insert and/or a plant growing within the insert from the upper end of the insert.

Also provided according to the present invention is a plant-growing tray having a container as hereinbefore described which is fillable with a growing medium and from which the growing medium can be lifted, the container having a base for supporting the growing medium, in which a lifting aperture extends through the base and at least a portion of the aperture is positioned beneath a corner of the growing medium. A benefit of this tray is that plant roots extending to a corner of the growing medium can be lifted through the lifting aperture. Plant roots normally concentrate in container base corners, forming a "rootball". The invention may therefore allow a plant to be lifted from the container with minimal damage to the plant root system. In contrast, lifting plants from some prior art containers, in which the container base is typically only provided with a central circular hole through which a lifter passes, can cause damage to a plant or disrupt the growing medium as the lifter exerts pressure only in the central, root-depleted area of the growing medium.

In one embodiment of this aspect of the invention, the lifting aperture is cruciform. The container may be substantially rectangular or square in transverse section and each end of the cruciform-shaped opening positioned beneath a corner of the growing medium. This arrangement may allow efficient lifting of a plant root system together with the growing medium with minimum disruption.

The lifting aperture formed in the base of the container may be defined by an inwardly angled edge of the base to facilitate entry of a lifter from beneath the base through the aperture. The feature may improve imprecise alignment of a lifter with a container aperture by providing means for the lifter to be guided into the aperture by the base. This may be particularly useful for mechanical lifters.

In this aspect of the invention, the growing medium may be held within an insert as defined above. Here, the insert may be lifted through the lifting aperture, for example by inserting a lifter through the lifting aperture, with at least a portion of the aperture being beneath a corner, or a lifter-engaging structure, of the insert.

In another aspect of the invention, there is provided a method of removing a plant from a plant-growing tray as defined herein, comprising the step of inserting a lifter through the lifting aperture to release the growing medium from the container. Advantages of using a lifter are described above in the aspect of the invention comprising a lifting aperture extending through the base of a container where at least a portion of the aperture is positioned beneath a corner of a growing medium.

In a further aspect of the invention, there is provided a method of removing a plant from a plant-growing tray as defined herein, comprising the steps of lifting the insert through the lifting aperture to detach an outer surface of the insert from the side wall of the container and then detaching the plant from the insert. Benefits of the method are described above. Lifting the insert only a limited distance so that at least a portion of it remains within the container while the growing medium is removed from the insert may afford some protection to the insert and diminish or eliminate the need for handling of the insert at the plant extraction stage.

Further provided according to the invention is an apparatus for removing a plant from a plant-growing tray as defined herein, comprising a lifter which is insertable through the lifting aperture and which has a portion which lifts the insert and a portion which detaches the plant from the insert.

Also provided is an apparatus for removing a plant from a plant-growing tray as defined herein, comprising a first lifter and a second lifter each of which are insertable through the lifting aperture, in which the first lifter lifts the insert and the second lifter detaches the plant from the insert.

According to a further aspect of the invention there is provided a plant-growing tray comprising a container as defined herein.

Also provided according to the invention is an insert as defined herein.

According to another aspect of the invention, there is provided a plant grown in the container, insert, apparatus or plant-growing tray as defined herein, or produced by the method for growing a plant as defined herein.

Various embodiments of the invention will now be described by way of example with reference to the drawings, in which.

Figure 2:
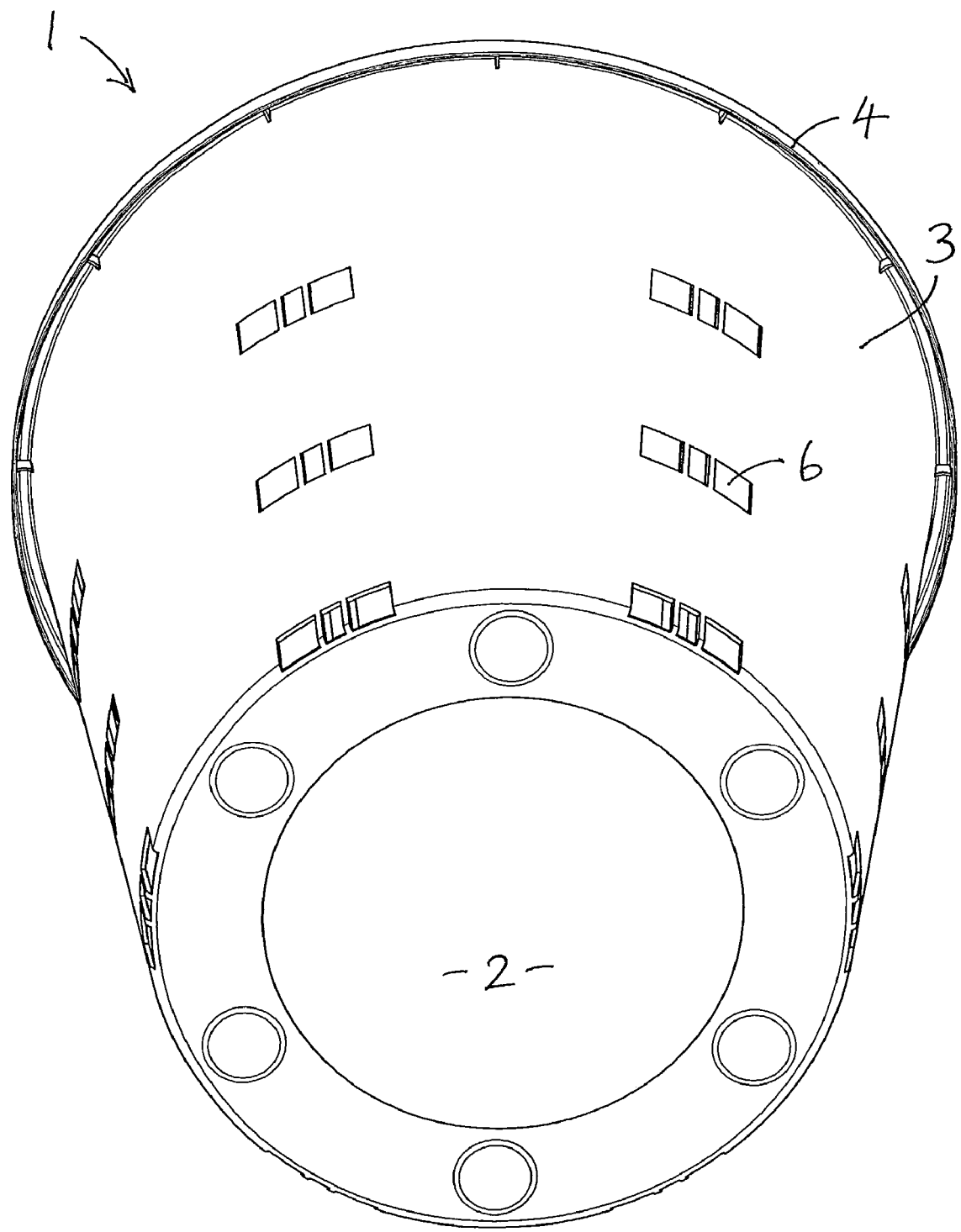
FIG. 2 is a three-quarter view of the container shown in FIG. 1 in an inverted position.
Figure 3A:
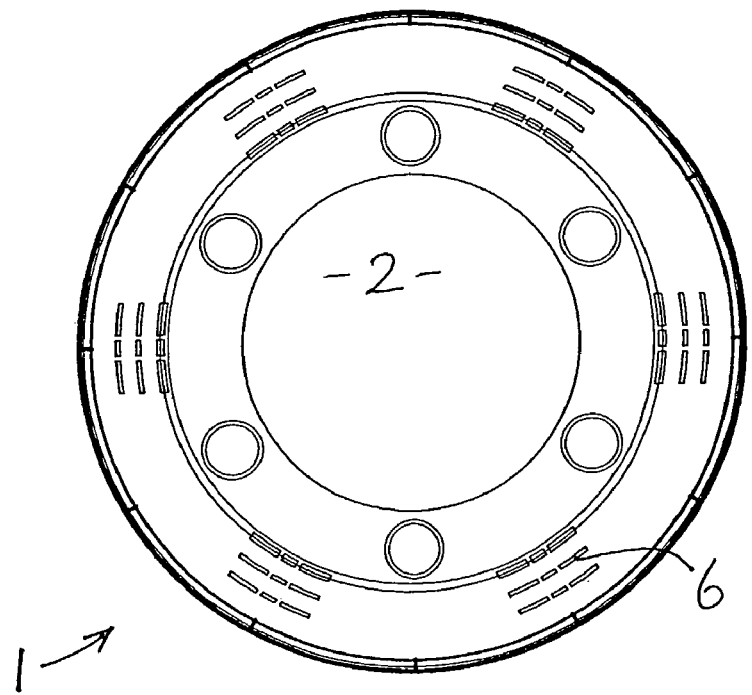
Figure 3B:
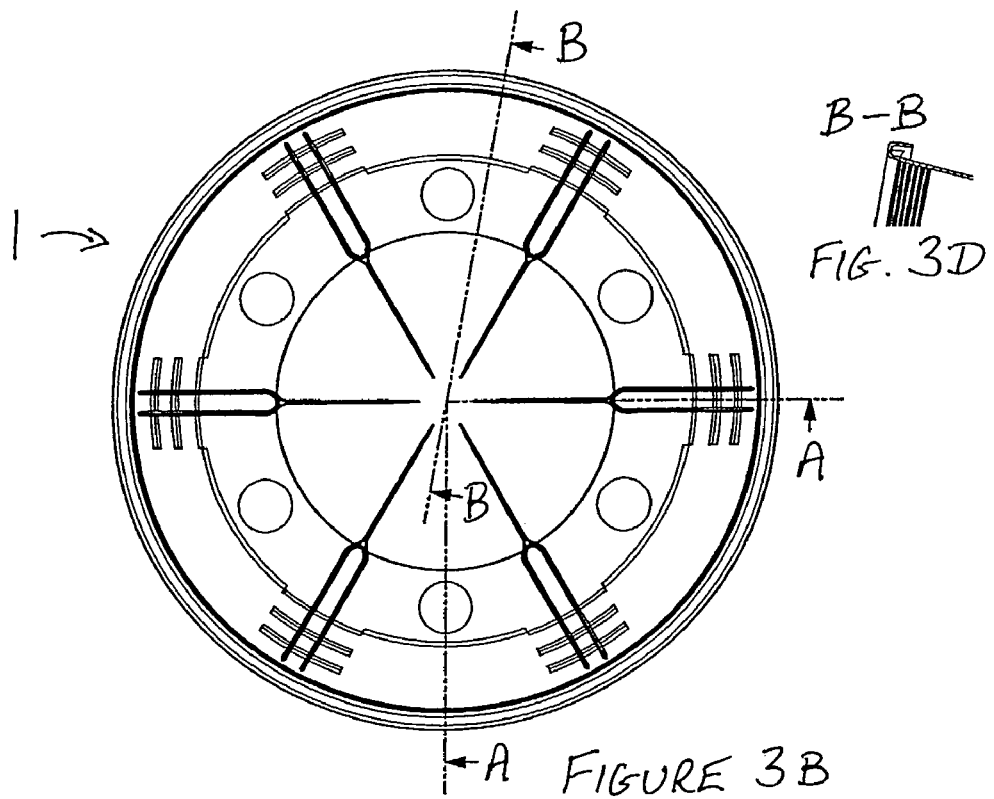
Figure 4:
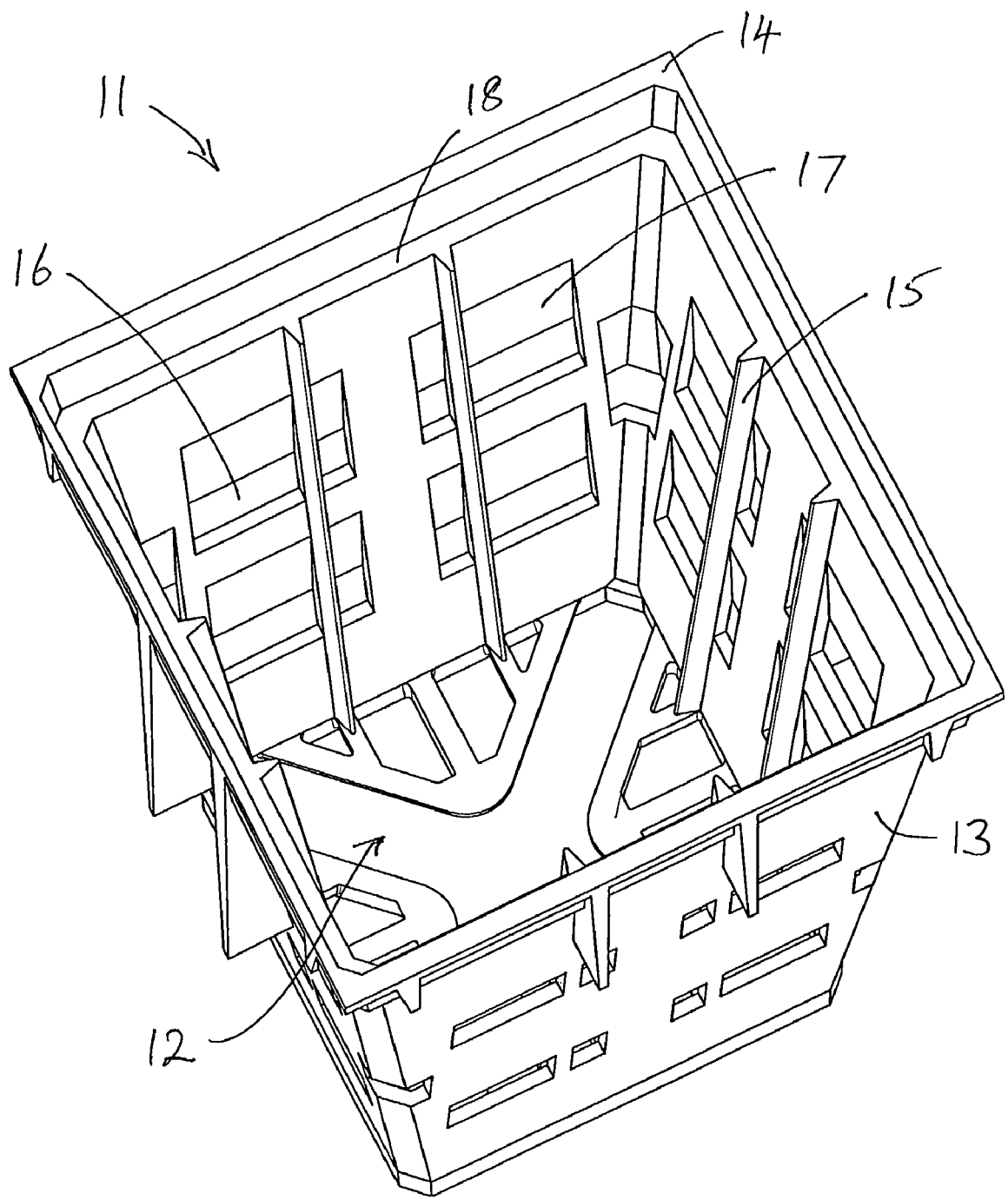
Figure 5:
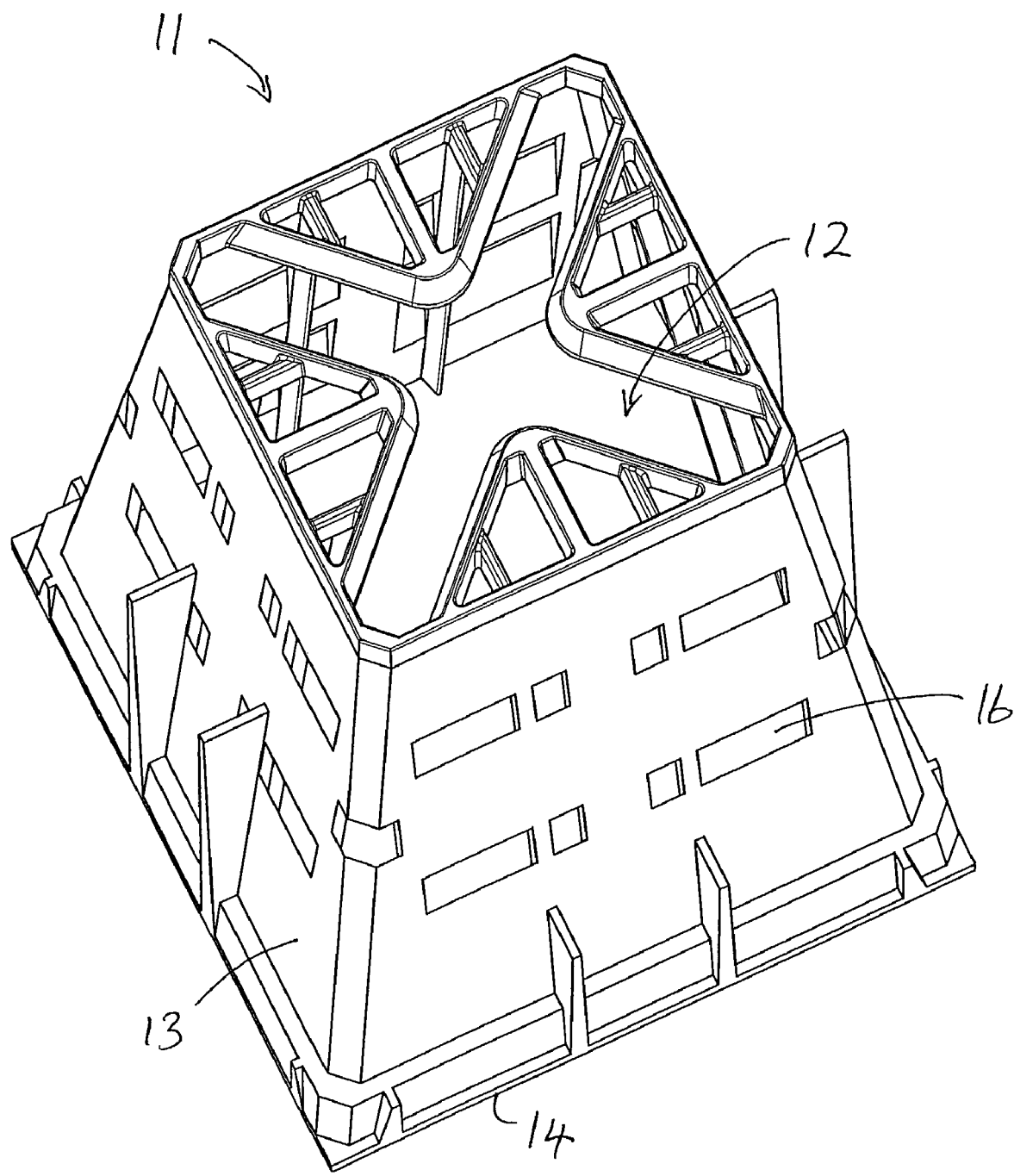
Figure 6H:
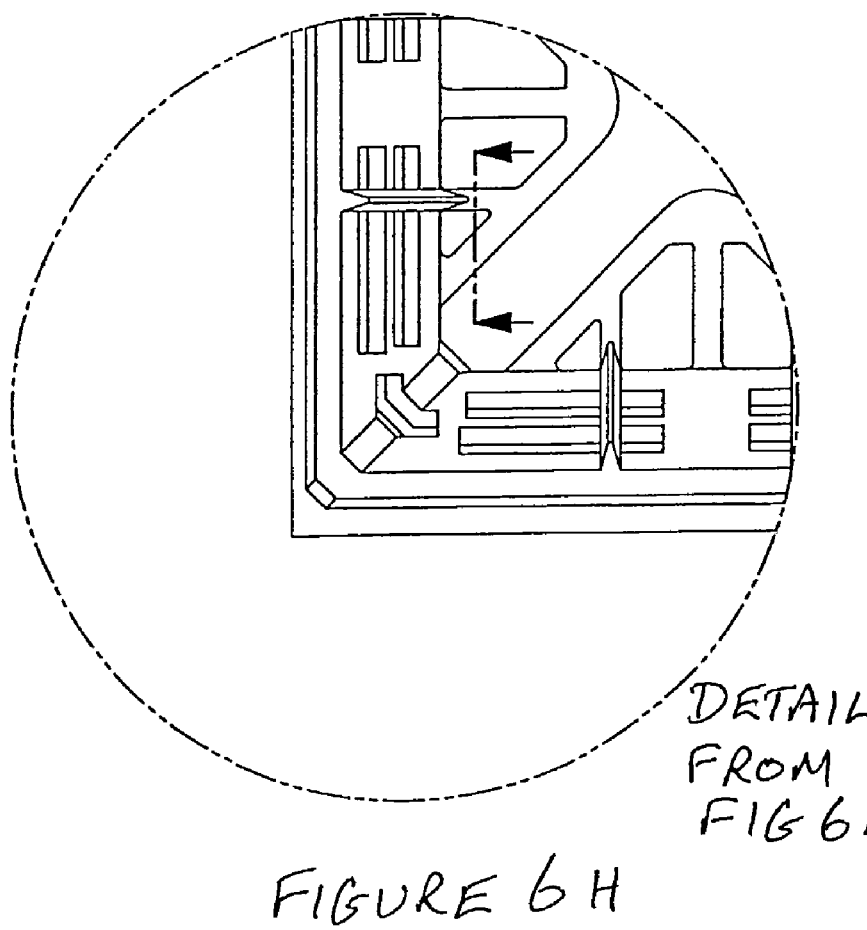
Figure 6G:
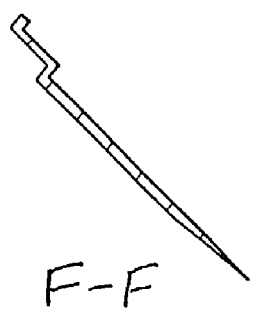
Figure 6E:
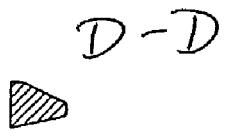
Figure 7:
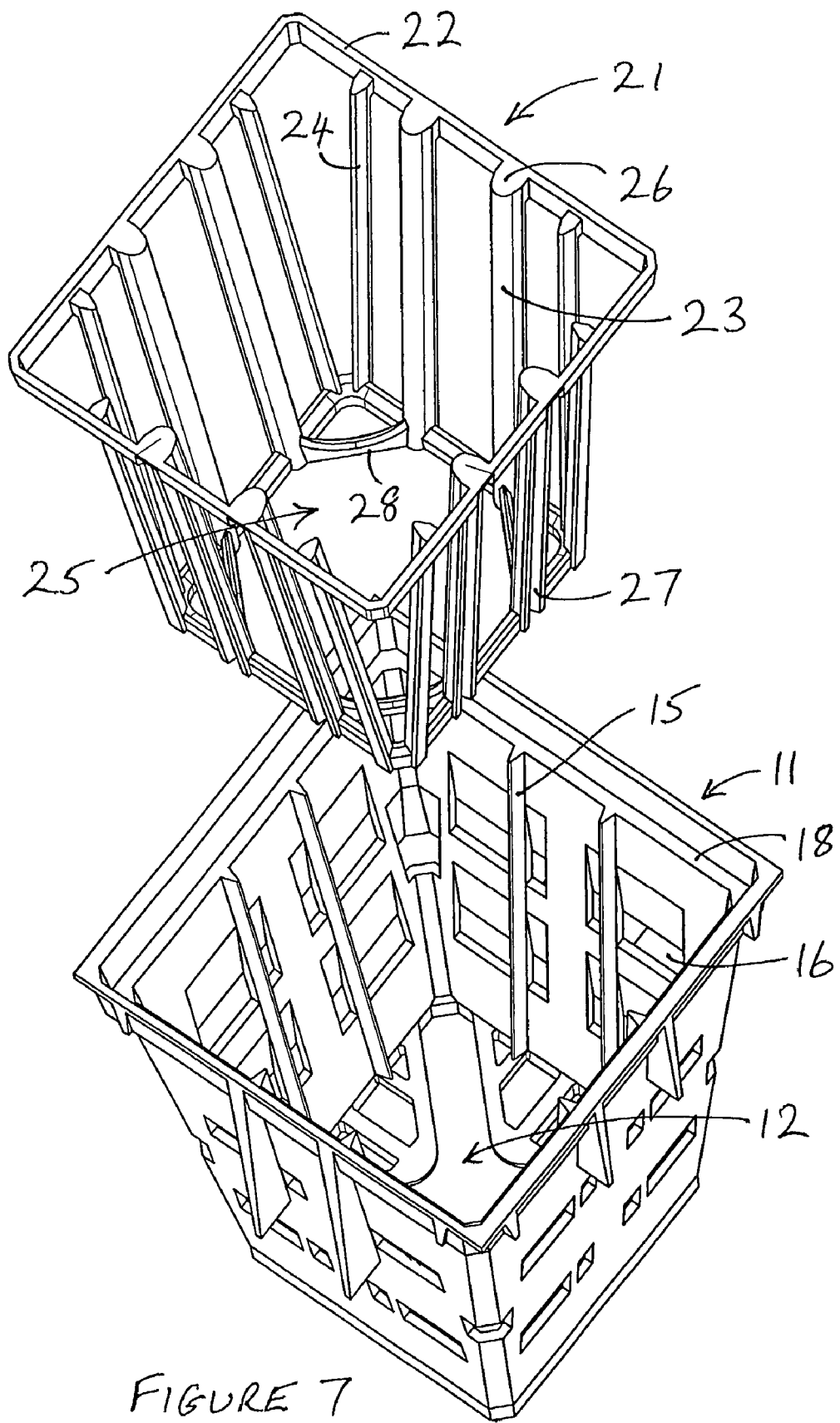
Figure 8B:
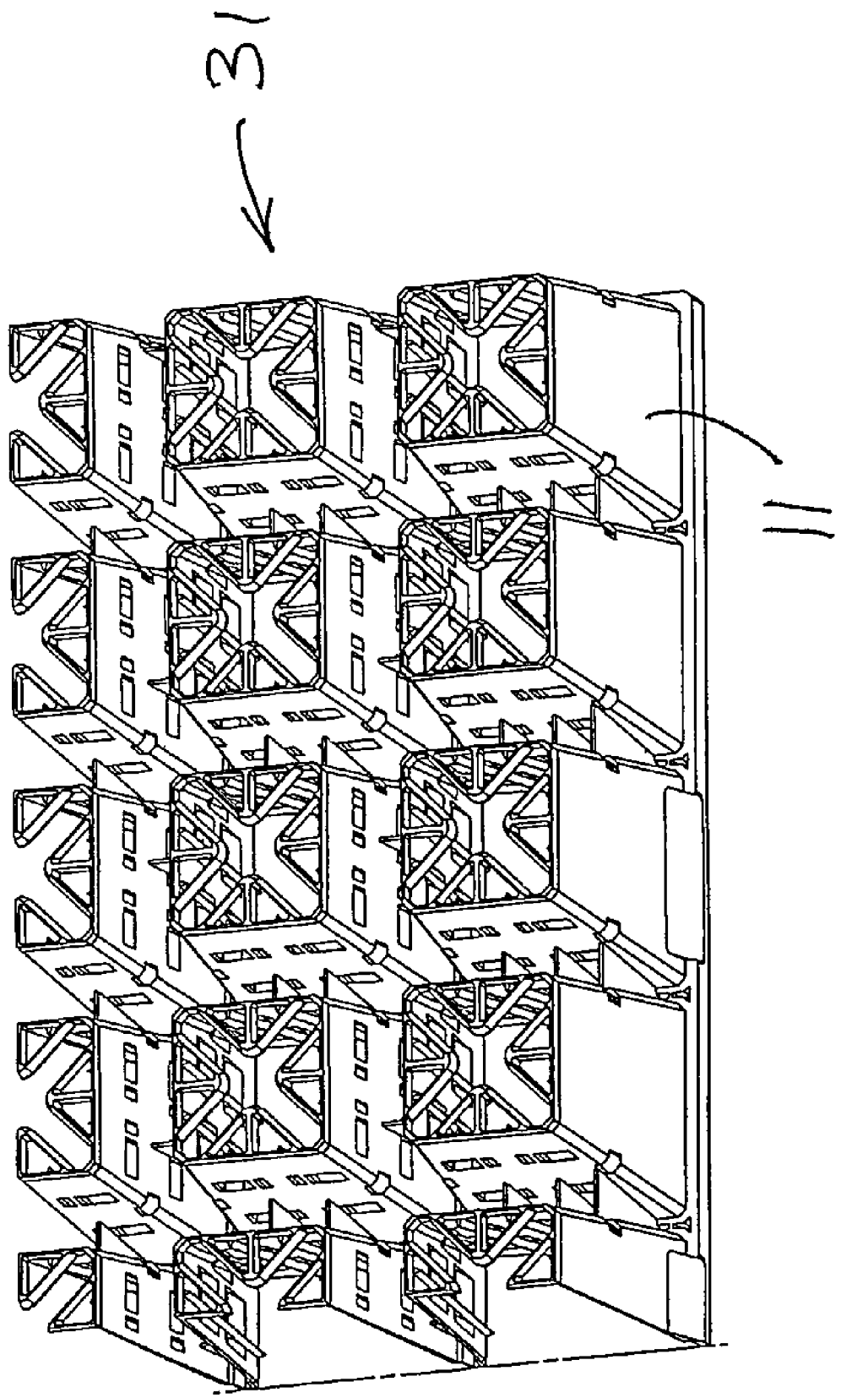

FIG. 3 shows further views and sections of the container depicted in FIGS. 1 and 2 as follows—
 (A) is a bottom view of the container,
 (B) is a top view of the container,
 (C) is a section through line A-A shown in part (B),
 (D) is a section through line B-B shown in part (B),
 (E) is a side view of the container,
 (F) is a section through line C-C shown in part (E),
 (G) is a section through line D-D shown in part (E),
 (H) is section through line E-E shown in part (G),
 (I) is a detailed section of the area circled in part (C), and
 (J) is a detailed section of the area circled in part (F);

FIG. 4 is a three-quarter view of a container according to a second embodiment of the invention in a standing position;

FIG. 5 is a three-quarter view of the container shown in FIG. 4 in an inverted position;

FIG. 6 shows further views and sections of the container depicted in FIGS. 4 and 5 as follows—
 (A) is a top view of the container,
 (B) is a bottom view of the container,
 (C) is a section through line A-A shown in part (A),
 (D) is a section through line B-B shown in part (A),
 (E) is a section through line D-D shown in part (A),
 (F) is a section through line E-E shown in part (A),
 (G) is section through line F-F shown in part (A),
 (H) is a detailed section of the area circled in part (A),
 (I) is a detailed section of the area circled in part (C), and
 (J) is a side view of the container;

FIG. 7 is a three-quarter view of the container depicted in FIGS. 4 to 6 together with an insert of the invention; and FIG. 8 is a three-quarter view of a plant-growing tray according to the invention in a standing position (A) and an inverted position (B).

Figure 1:
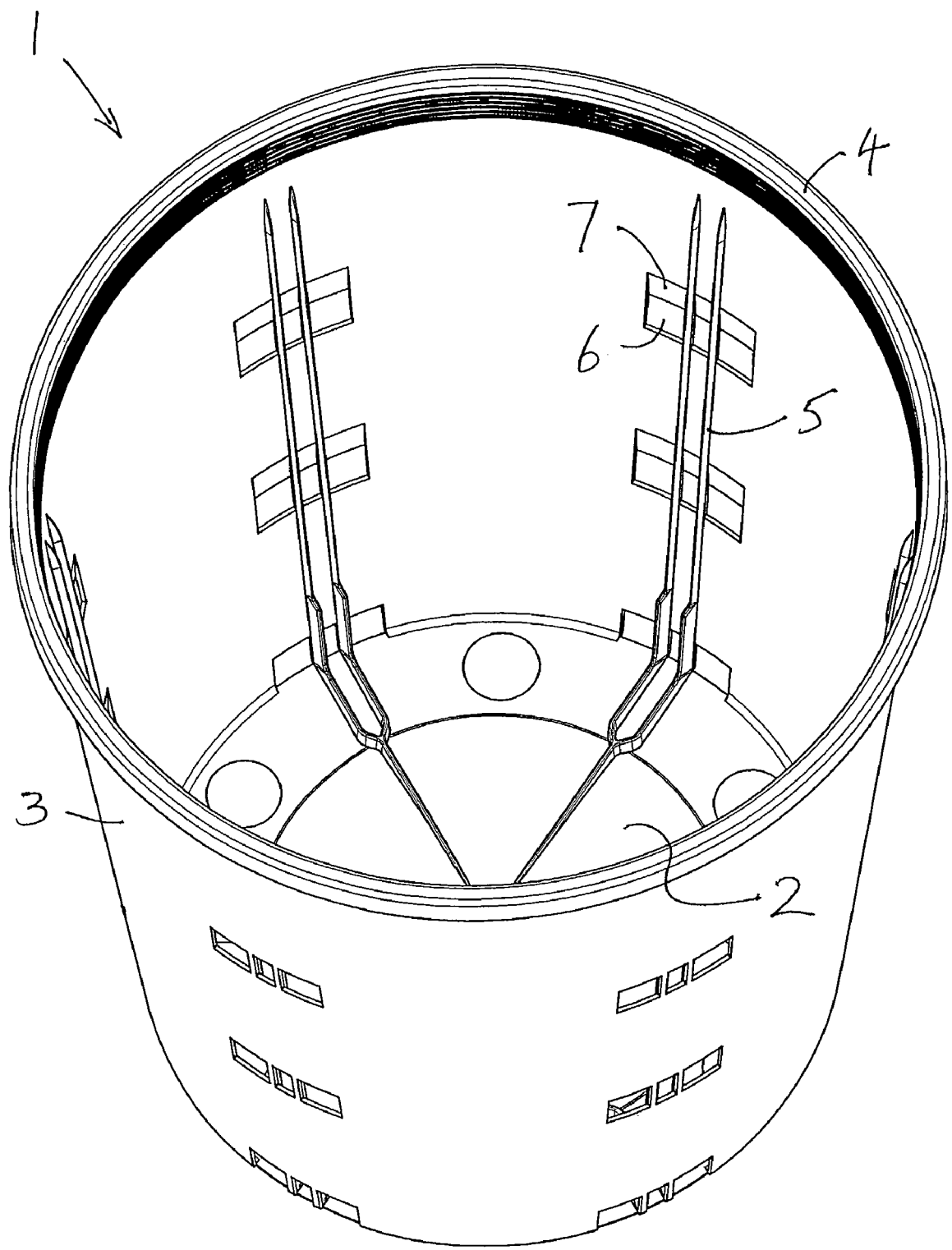
FIG. 1 is a three-quarter view of a plant-growing container according to a first embodiment on the invention in a standing position.

A container 1 according to a first embodiment of the invention is shown in FIGS. 1 to 3. As shown in FIGS. 1 and/or 2, the container is circular in transverse section and comprises a base 2, an outwardly inclined side wall 3 extending upwardly from the base to a rim 4, a plurality of ribs 5 positioned on the side wall and facing into the container, and a plurality of openings 6 defined in the side wall. Each rib where it meets the side wall defines a root-guiding angle which is substantially perpendicular and which leads to an opening. The openings are arranged radially (i.e. circumferentially) around the side wall in six vertical columns with three openings per column. An upper edge 7 of each opening is tapered to form a root-cutting edge. The container further comprises a plurality of base ribs 7 extending upwardly from the base and which are joined at one end with the side wall ribs. The ribs on the side wall extend further into the container at the base of the container.

Further details of features of the container will be apparent to the skilled reader from the views and sections shown in FIG. 3.

A root of a plant growing in the container will be trained in the root-guiding angle between the rib and the side wall. The root-guiding angle terminates at an opening, causing the root to become air-pruned at the opening. Roots which reach the base of the container will likewise be directed towards an opening adjacent the base. The ribs and openings thus minimise root circling and an air-pruned root system is established which will be able to continue growing after the plant has been removed from the container and transplanted. The shape of the container and the root-cutting edge of each opening facilitate removal of the plant and any root-retained soil from the container. In particular, roots which protrude from the openings (for example due to root thickening in humid air conditions) will not prevent the plant from being lifted as these protruding root ends will be cut as they move past the root-cutting edge.

The container will advantageously be white to keep the container cooler in sunlight. While the container may be manufactured in various sizes, in a preferred embodiment the size of the container is approximately one US gallon (i.e. about 3.785 litres).

A container 11 according to a second embodiment of the invention is shown in FIGS. 4 to 6. As show in FIGS. 4 and/or 5, the container is square in transverse section and comprises a base forming a cruciform-shaped opening 12, an outwardly inclined side wall 13 extending upwardly from the base to a rim 14, a plurality of ribs 15 positioned on the side wall and facing into the container, and a plurality of openings 16 defined in the side wall. Each rib where it meets the side wall defines a root-guiding angle which is substantially perpendicular and which leads to an opening. An upper edge 17 of each opening is tapered to form a root-cutting edge. A ledge 18 is located on the inside of the side wall towards the rim.

Further details of the container according to the second embodiment will be apparent to the skilled reader from the views and sections shown in FIG. 6.

The containers of the first and second embodiments are preferably made from injection-moulded plastic.

The container of the second embodiment may be used in similar way to the container of the first embodiment. However, the container of the second embodiment is designed also to accommodate a removable insert 21 as shown in FIG. 7. The insert is a light-weight "basket" and is also preferably made from injection-moulded plastic. The insert is square in transverse section with four corners and comprises an upper rim 22 from which main ribs 23 and secondary ribs 24 depend downwardly to a rim of a substantially open insert base 25. The ribs taper inwardly to match the container shape. Each main rib has an upper end 26 adjacent to the upper rim and is formed with a groove 27 along its outer surface which fits over a rib of a container into which the insert is fitted. A lower surface of the upper rim of the insert rests on the ledge of the insert when the insert is fully inserted into the container. This will prevent plants growing in the insert, and/or growing medium, from becoming trapped between the upper rim of the insert and the rim of the container.

A lifting rib 28 bridges each corner of the rim of the insert base. When the insert is fully inserted into the container, each lifting rib lies across one arm of the cruciform-shaped opening formed by the base of the container. Arms of the cruciform-shaped opening can be about 7 mm in width to retain compost while providing good drainage, although different growing media may require different dimensions. The cruciform-shaped opening exposes a surface area of the growing medium and/or insert within the container. This exposed surface area can be contacted by a lifter to lift the growing medium and/or insert from the container. A larger cruciform-shaped opening will allow a lifting force to be spread over a larger exposed surface area of the growing medium and/or insert and hence the root system of a plant growing within the container.

The structure of the insert provides a "basket" for retaining the growing medium and is designed so that when the insert is lifted from the container, substantially all of the growing medium is also lifted. If desired, the growing medium and any plant growing therein can then be lifted out of the insert. The force required to do this should be less than that needed to lift the growing medium from the container because the area of contact between the growing medium and the insert should be less than that between the growing medium and the container.

The insert is designed to fit "hand-in-glove" into the container. A neat (snug) fit is aided by the main ribs which fit over the ribs of the container. The secondary ribs provide structural support to the insert, assist in retaining the growing medium within the insert and also define a further root-guiding angle in combination with the side wall of the container when the insert is in place to facilitate root air-pruning.

The design of the insert also allows efficient interaction with propagation machines involved in lifting, extraction and/or transplantation of plants.

A benefit of the cruciform-shaped opening is than it reaches to the corners of the container base and allows the lifter to lift at these corners where roots normally concentrate. This allows more effective lifting of a plant growing within the container without causing damage to the roots or the growing medium.

The container shown in FIGS. 4 to 7 is preferably part of a plant-growing tray 31 comprising several containers as shown in FIG. 8. The plant-growing tray comprises a plurality of regularly-spaced containers. Containers located at the outside edges of the plant-growing tray may have fewer openings at their outward-facing sidewalls to reduce water-loss.

It is possible to grow plants, whether from seed, seedlings or cuttings, in the plant-growing tray containers with or without the insert. The insert does not negatively affect the growth of a plant. The insert can function to provide a quick and easy way of removing growing medium and/or a plant from the plant-growing tray. During the growing stage, the plant-growing tray can be consolidated by removing inserts lacking a growing plant or containing an unhealthy or stunted plant. The ability to remove the insert together with the growing medium contained within the insert, provides an efficient means for replacing or repositioning inserts within the plant-growing tray. Sorting of healthy plants is improved as follows: a plant can be dislodged, or lifted, from the container without damaging the plant because lifting or extraction forces are borne primarily by the structure (for example, the main and secondary ribs) of the insert rather than the plant root system.

A grid, for example a metal grid, can optionally be placed over the plant-growing tray to hold inserts within some or all of the containers.

The advantages of the container of the present invention are applicable both with individual containers and with containers forming part of a plant-growing tray, either with or without a removable insert.

The invention claimed is:

1. A container for growing plants, comprising:
a base,
a side wall extending upwardly and inclined outward from said base wherein said wall comprises an interior surface;
an opening in said side wall;
a rib positioned on said interior surface of said side wall extending inwardly from said side wall at an angle wherein said angle terminates at said opening and guides a root towards said opening.

2. The container according to claim 1, in which the angle is between 60 and 120 degrees.

3. The container according to claim 2, in which the angle defined between the rib and the side wall is between 75 and 105 degrees.

4. The container according to claim 1, in which the angle is oriented such that, in use, a root of a plant growing in the container grows downwardly along the rib into the opening to become air-pruned.

5. The container according to claim 1, in which the rib has first and second sides, first and second angles for guiding the growth of roots being defined between the respective first and second sides of the rib and the side wall.

6. The container according to claim 1, in which the side wall is inclined at a substantially constant angle.

7. The container according to claim 1, in which the side wall is inclined at an angle between substantially vertical and 30 degrees.

8. The container according to claim 1, in which the side wall does not contain horizontal ledges.

9. The container according to claim 1, in which the rib is substantially parallel to the side wall.

10. The container according to claim 1, comprising at least one further opening defined in the side wall.

11. The container according to claim 10, in which the opening and the at least one further opening are vertically spaced in the side wall.

12. The container according to claim 11, in which the angle defined between the rib and the side wall leads to the opening and the at least one further opening spaced vertically in the side wall.

13. The container according to claim 1, comprising two or more ribs, namely the rib and at least one further rib extending inwardly from the side wall and facing into the container.

14. The container according to claim 13, in which the two or more ribs are positioned radially on the side wall.

15. The container according to claim 1, which is substantially circular in transverse section.

16. The container according to claim 1, which is substantially square in transverse section.

17. The container according to claim 1, in which the side wall opening has a tapered upper edge which forms a root-cutting edge on removal of a plant from the container.

18. The container according to claim 1, in which the container is formed as an individual unit.

19. The container according to claim 1, in which the container is part of a multi-container plant-growing tray.

20. The container according to claim 1, in which the container is part of a multi-container plant-growing tray with 45 containers or cells arrayed in a 5-container by 9-container grid.

21. The container according to claim 1, in which at least one rib is integral with the sidewall.

22. The container according to claim 1 further comprising a removable insert.

23. The container according to claim 22, in which at least one rib is part of said removable insert.

24. The container according to claim 23, in which at least one rib is integral with the container and at least one rib is part of said removable insert.

25. The container according to claim 23, in which the removable insert is shaped so that, firstly, an outer surface of a growing medium filled into the removable insert contacts both an inner surface of the removable insert and an inner surface of the side wall, and secondly, when the insert is removed, substantially all of the growing medium is retained by the removable insert.

26. The container according to claim 23, in which the removable insert comprises growing-medium-supporting side structures and an insert base.

27. The container according to claim 26, in which the growing-medium-supporting side structures extend upwardly from the insert base to an upper rim.

28. The container according to claim 26, in which one or more growing-medium-supporting side structures are in the form of ribs.

29. The container according to claim 26, in which a lifting structure of the insert base intercepts an aperture in the container base which allows access to lift the removable insert.

30. The container according to claim 27, in which the growing-medium-supporting side structures are inwardly displaced from the upper rim so that the upper rim extends outwardly beyond an inner surface of the side wall when the removable insert is inserted.

31. A plant-growing tray comprising a container as defined in claim 1.

32. A container for growing plants, comprising:
   a base,
   a side wall extending upwardly and inclined outward from said base wherein said wall comprises an interior surface;
   an opening in a plane of said side wall;
   a rib positioned on said interior surface of said side wall extending inwardly from said side wall at an angle and extending vertically across said opening.

33. A container for growing plants, comprising:
   a base,
   a side wall extending upwardly and inclined outward from said base wherein said wall comprises an interior surface;
   an opening in said side wall wherein said opening comprises a tapered upper edge which forms a root-cutting edge on removal of a plant from said container;
   a rib positioned on said interior surface of said side wall extending inwardly from said side wall at an angle and extending vertically across said opening;
   wherein said rib comprises a face and said face leads to said opening and guides a root towards said opening.

* * * * *